United States Patent Office 2,989,463
Patented June 20, 1961

2,989,463
LUBRICANTS CONTAINING BASIC METAL ADDITIVES
Thomas W. Mastin, Willoughby, Ohio, assignor to The Lubrizol Corporation, Wickliffe, Ohio, a corporation of Ohio
No Drawing. Filed Sept. 30, 1958, Ser. No. 764,260
10 Claims. (Cl. 252—25)

This invention relates to lubricating compositions and in particular to lubricating compositions which have been improved by the addition thereto of a class of chemical compositions. Such improved lubricating compositions are especially useful for use in the lubrication of certain automatic transmission units. They are useful also in the lubrication of internal combustion engines.

The lubrication of an automatic transmission unit which employs frictional clutch surfaces demands an unusual combination of properties from a lubricant. In addition to the ordinary requirements of oiliness, high viscosity index, protection from rust, extreme pressure, corrosion, oxidation, etc. the lubricant must be capable of allowing the clutch plates to become engaged and disengaged smoothly, i.e., without jerkiness. This means that the two clutch plates must slide into contact with one another and then become firmly engaged so that the transmision of power from the engine to the wheels is efficient. This is a notably severe requirement and one which was not realized prior to the advent of this type of automatic transmission.

The failure of a lubricant to provide such smooth operation is manifested not only by an obviously uneven and interrupted transmission of power from the engine to the wheels, but also by a peculiar chattering noise. This noise is in the nature of a "squawk" and various tests have been devised which depend upon an observation of such "squawking" for an evaluation of the lubricant being tested.

It has been established that the "squawking" noise is definitely associated with the impending or actual failure of the lubricant to provide the smooth transmission of power in this respect, so that the "squawking" or chattering is a reliable index of the performance of the lubricant.

It is accordingly a principal object of this invention to provide improved lubricating compositions.

It is also an object of this invention to provide lubricating compositions which are especially adaptable for use in the lubrication of automatic transmissions.

It is still another object of this invention to provide lubricating compositions which will provide for the smooth operation of an automatic transmission unit.

These and other objects of the invention will be apparent from the following description thereof.

I have discovered an improved lubricating composition comprising a mineral lubricating oil and in combination therewith from about 0.25 to about 5.0 percent by weight as sulfate ash of a product prepared by a process which comprises preparing a mixture of (a) An alkylated phenolic compound,
(b) An oil-soluble, metal-free, non-tautomeric polar compound having at least 12 aliphatic carbon atoms selected from the class consisting of esters, alcohols and amines, present in an amount greater than that of (a) on a weight basis, and
(c) At least two equivalents of a basic barium compound per equivalent of (a), and heating said mixture to drive off substantially all free water which may be present and then treating said water-free mixture with carbon dioxide until the titratable basicity of the mixture has been reduced to a base number less than 10. Such a combination is useful not only in the lubrication of automatic transmission units, but likewise is of significant utility in the lubrication of internal combustion engine, and for lubrication of moving metal parts generally.

The alkylated phenolic compounds contemplated for use in the above process are particularly those which yield oil-soluble metal phenates and in which an alkyl group contains at least about three carbon atoms. Such alkyl groups as isopropyl, tertiary-butyl, 2-methylamyl-4, iso-heptyl, diisobutyl, n-decyl, tetrapropyl, octadecyl, polyisobutyl (derived from polyisobutylene fractions of various molecular weights), etc. are illustrative of the groups which may be used. In lieu of alkyl groups, cycloalkyl groups such as, e.g., cyclohexyl, methyl-cyclohexyl, etc. may be used. The alkylated phenolic compound may contain other groups in addition to the alkyl or cycloalkyl groups. Thus, halogen, nitro, alkoxy, etc. groups may be present. Likewise the aldehyde condensation products of the above-described alkylated phenolic compounds are contemplated. Particularly preferred because of their effectiveness are the lower alkyl phenols such as the heptyl, octyl, nonyl, etc. phenols.

The basic inorganic barium compounds include principally barium oxide and hydroxide and in some instances the sulfide, hydrosulfide, etc. Most commonly used, however, are the oxide and hydroxide. As indicated this basic inorganic barium compound should be used in the process in an amount equal to at least two equivalents per equivalent of the alkylated phenolic compound. As regards the use of larger amounts of basic inorganic barium compound it is apparent that any amount of such basic inorganic metal compound in excess of this minimum amount can be used, up to that amount which is no longer effective to increase the proportion of metal in the oil-soluble product.

The process mixture generally contains some water which is added to aid in fluidizing the inorganic metal compound. It is necessary that this water be removed from the mixture before the process can be carried out. Removal of the water is a simple matter, involving only its distillation from the process mixture. The temperature at which the mass is treated with an acidic gas usually is above 100° C., and in the course of heating the process mixture to this temperature the last traces of free water are substantially eliminated.

The oil-soluble, metal-free, non-tautomeric compounds are characterized by having both an oil-solubilizing substituent, such as a long hydrocarbon chain, and also by having a non-acidic polar group such as an ester, amine, or hydroxy group. Some specific examples of such polar compounds include the following: glyceryl oleate or stearate, octadecenyl or oleyl alcohol, tridecyl alcohol, N-octadecyl propylene diamine; sperm oil, lard oil, and other fatty or waxy esters, etc. The most suitable polar compounds have been found to be those which contain a total of at least 12 aliphatic carbon atoms in the molecule. For an appropriate discussion of the word "tautomeric," reference may be had to "Advanced Organic Chemistry," by G. W. Wheland, John Wiley and Sons, New York, 1949, chapter 14.

The use of the above-described polar compounds in the process of this invention appears to have a solubilizing effect with respect to the basic inorganic metal compound which is incorporated into the ultimate product. This is an unexpected function for such neutral and basic non-tautomeric materials and it is not clear how such a function can be explained in terms of the molecular structure of a non-acidic compound. The previous use of such compounds in fluidizing and imparting filterability to oleaginous compositions is well-known, but so far as I am aware, it has not been known that neutral or basic non-tautomeric metal-free polar compounds are capable of sustaining the solubility of otherwise insoluble metal compounds in oil which does not also contain any of the well-known dispersants, such as sulfonates or carboxylates.

It is quite probable that the neutral or basic non-tautomeric polar compound has certain hitherto unknown dispersant qualities which enable it to preserve the basic inorganic metal compound in a colloidal suspension, although as indicated previously, it is not known just how it really does operate. This non-tautomeric, polar compound should be present, as indicated earlier, in an amount greater than that of (a) on a weight basis, and it can be present as indicated in the examples which follow, in an amount up to about fifteen times as much as (a), on a weight basis.

The treatment with carbon dioxide is conducted in such a manner as to reduce substantially the titratable basicity of the mass. There are essentially two materials in the mass prior to carbonation which are susceptible to reaction with the acidic gas: the free metal base (that which is in excess of the stoichiometric quantity required to form the normal phenate) and the metal phenate. It is possible that each of the materials reacts with the acidic gas (e.g., is carbonated) simultaneously, but it is more likely that the excess metal base reacts first and when this reaction is complete the metal phenate reacts. It is understood, of course, that reaction of the metal phenate results in the liberation of the phenol from its metal salt.

The amount of carbon dioxide which is used in the process depends in some respects upon the desired basicity of the particular product in question. Thus, in the case of a highly basic product only a small amount of carbon dioxide will be required. Ordinarily, however, a less basic product is desired and in such instances a larger amount of carbon dioxide is used. A particularly preferred product is one in which the base number is less than about 10. The preparation of such a relatively neutral product entails the use of a rather large amount of carbon dioxide, i.e., more than 25 percent by weight of the amount of the metal phenate which is being so treated. Generally, more than the theoretical quantity of carbon dioxide is required to achieve any desired degree of basicity in a particular product.

In some instances a more basic product may be acceptable and the preparation of such products will require the use of only 10–25 percent by weight of carbon dioxide based on the metal phenate being treated.

The treatment of the above-described process mixture with carbon dioxide appears to have two quite beneficial effects. It has a clarifying effect on both the process mixture and on the ultimate product, and it allows the incorporation of significantly more barium into the oil-soluble product. It is apparent that this latter effect can be realized only when there is present in the reaction mixture an appreciable quantity of oil-insoluble barium compound. Thus, it is important for the incorporation of the maximum amount of barium that the process mixture not be separated (as, e.g., by filtration) from oil-insoluble barium compound before carbonation.

The following examples illustrate some of the details of the process by which the lubricant additives of this invention are prepared. The term "metal ratio" employed in this specification is the ratio of total barium in the oil-soluble composition to total equivalents of alkylated phenolic compound present. It is thus a convenient measure of the amount of excess barium present in the composition, i.e., that amount of barium in excess of the stoichiometric amount required to satisfy the organic salt-forming anions present.

EXAMPLE 1

To a mixture of 268 grams (1.0 equivalent) of oleyl alcohol, 675 grams of mineral oil, 124 grams (0.6 equivalent) of diisobutylphenol, and 146 grams of water, at 70 C. there was added 308 grams (4.0 equivalents) of barium oxide. This mixture was heated at reflux temperature for one hour, then at 150° C. while a stream of carbon dioxide was bubbled through the mixture until it was substantially neutral. The thus acidified mixture was filtered and the clear, brown, oil-soluble filtrate found to have the following analyses:

Percent sulfate ash _____ 29.8
Neut. No. _____(basic)__ 2.6
Metal ratio _____ 6.0

EXAMPLE 2

A mixture of 268 grams (1.0 equivalent) of oleyl alcohol, 90 grams (0.6 equivalent) of tertiary-butyl phenol, 1114 grams of mineral oil, and 190 grams of water was warmed to 70° C., treated with 306 grams (4.0 equivalents) of barium oxide and then heated to 150° C. A stream of carbon dioxide was bubbled into the mixture at this latter temperature until the mixture was substantially neutral. Filtration through Hyflo yielded a clear, brown, oil-soluble filtrate with the following analyses:

Percent sulfate ash _____ 23.4
Neut. No. _____(basic)__ 6.7
Metal ratio _____ 6.2

EXAMPLE 3

A mixture of 423 grams (1.0 equivalent) of sperm oil, 124 grams (0.6 equivalent) of diisobutylphenol, 520 grams of mineral oil and 146 grams of water was prepared, heated to 70° C. and then treated with 308 grams (4.0 equivalents) of barium oxide. This mixture was refluxed for an hour, then dried by heating to 150° C., and carbonated by treatment with carbon dioxide at this temperature until it was slightly acidic. Filtration of this material yielded a clear, light brown, non-viscous liquid having the following analyses:

Percent sulfate ash _____ 31.2
Neut. No. _____ 0.4
Metal ratio _____ 6.3

EXAMPLE 4

A mixture of 1269 grams (3.0 equivalents) of sperm oil, 522 grams (1.8 equivalents) of a heptylphenol-formaldehyde condensation product (1:0.4 mole ratio, respectively, heated in a mineral oil solvent at about 90° C. with a small amount of ammonium hydroxide), 2169 grams of mineral oil and 540 grams of water was treated at 70° C. with 1134 grams (14.8 equivalents) of barium oxide. This mixture was stirred at reflux temperature for one hour then at 150° C. while carbon dioxide was bubbled beneath the surface. Filtration yielded a clear liquid having the following analyses:

Percent sulfate ash _____ 32.7
Neut. No. _____(basic)__ 1.9
Metal ratio _____ 8.2

EXAMPLE 5

To a mixture of 915 grams (2.2 equivalents) of a sulfurized sperm oil, 273 grams (1.3 equivalents) of diisobutylphenol, 1715 grams of mineral oil, and 396 grams of water there was added at 70° C. 833 grams (10.8 equivalents) of barium oxide. This mixture was heated at reflux temperature for an hour and then at 150° C. at which temperature carbon dioxide was bubbled through the mixture until it was substantially neutral. The mixture was filtered through Hyflo (a siliceous filter aid) to yield a liquid having the following analyses:

Percent sulfate ash _____ 28.7
Neut. No. _____(basic)__ 2.9
Metal ratio _____ 7.0

EXAMPLE 6

To a mixture of 174 grams (0.1 equivalent) of N-octadecyl propylene diamine, 124 grams (0.6 equivalent) of diisobutylphenol, 766 grams of mineral oil, 146 grams of water there was added 306 grams (4.0 equivalents) of barium oxide and the whole refluxed for an hour. Water was removed by raising the temperature to 150° C. whereupon carbon dioxide was bubbled through the mixture at this temperature until it was substantially neutral. The mixture was filtered through Hyflo (a siliceous filter aid) to yield a clear oil-soluble liquid having the following analyses:

Percent sulfate ash _____ 28.9
Neut. No. _____(basic)__ 2.5
Metal ratio _____ 5.8

EXAMPLE 7

To a mixture of 516 grams (2.0 equivalents) of a N-octadecyl propylene diamine-ethylene oxide condensation product (obtainable from Armour Co., under the tradename Ethoduomeen T), 346 grams (1.2 equivalents) of a heptylphenol-formaldehyde condensation product, 1776 grams of mineral oil and 360 grams of water there was added 756 grams (9.9 equivalents) of barium oxide. After refluxing this mixture for one hour the temperature was raised to 150° C. and carbon dioxide was bubbled through the mixture until it was substantially neutral. Filtration through Hyflo (a siliceous filter aid) yielded a liquid product having the following analyses:

Percent sulfate ash _____ 29.6
Neut. No. _____(basic)__ 0.8
Metal ratio _____ 7.4

EXAMPLE 8

A mixture of 423 grams (1 equivalent) of sperm oil, 123 grams (0.602 equivalent) of a heptylphenol, 1214 grams of mineral oil, 452 grams of water was treated at 70° C. with 612 grams (8 equivalents) of barium oxide. This mixture was stirred at reflux temperature for one hour and at 150° C. while carbon dioxide was bubbled beneath the surface. Filtration yielded a clear liquid having the following analyses:

Percent sulfate ash _____ 35
Neut. No. _____(basic)__ 10
Metal ratio _____ 12.3

EXAMPLE 9

To a mixture of 1162 grams (2 equivalents) of an N-octadecyl propylene diamine-formaldehyde (1:3.5 mole ratio, respectively, heated to about 100° C .with a small amount of an aqueous alkali as the catalyst) condensation product, 123 grams (0.6 equivalent) of heptylphenol, 1345 grams of mineral oil, and 360 grams of water there was added at 70° C. 756 grams (9.9 equivalents) of barium oxide. After refluxing this mixture for 10 minutes, the temperature was raised to 150° C. and carbon dioxide was bubbled through the mixture until it was substantially neutral. Filtration through Hyflo (a siliceous filter aid) yielded a liquid product having the following analyses:

Percent sulfate ash _____ 29.6
Neut. No. _____(basic)__ 0.3
Metal ratio _____ 14.8

The preceding examples illustrate the more usual practice of the process by which the lubricant additives of this invention are prepared, i.e., the use of an amount of basic barium compound (component c) which is from 2 to about 20 times that of the phenolic compound of (component a) on an equivalent basis. The invention, however, is not restricted to the use of additives prepared by a process limited to this range of ratio; quite satisfactory products may be prepared using a much higher ratio, and the use of larger amounts of the basic barium compound of component c in the process is shown by the tabulated data of Examples 10–14. Each of these exam-ples involved the reaction of 1.0 equivalent of sperm oil, 0.15 equivalent of diisobutyl phenol and a variable amount of barium oxide as indicated in the table. Water was used in an amount equal to 15% of the total reaction mixture and an amount of oil was used as a diluent such that the theoretical sulfate ash content of the mixture was 32.0%. The procedure of Example 3 was followed.

| Ex. No. | BaO | (c)/(a) | Percent sulfate ash | Neut. No. | Metal Ratio |
|---|---|---|---|---|---|
| 10 | 3.75 | 25 | 30.4 | [1] 0.5A | 23.8 |
| 11 | 5.25 | 35 | 31.0 | [2] 0.7B | 34.0 |
| 12 | 7.5 | 50 | 30.4 | 1.0B | 47.5 |
| 13 | 11.3 | 75 | 26.2 | 1.3B | 61.5 |
| 14 | 15.0 | 100 | 20.1 | 1.4B | 62.8 |

[1] Acidic.
[2] Basic.

It will be noted that the incorporation of increased amounts of metal into the oil-soluble product continues to characterize the process when the ratio (c) to (a) is as high as 75:1, but that further increase of this ratio has very little effect with respect to the incorporation of metal into the oil-soluble product.

The oil-soluble compositions containing large amounts of metal prepared by the process illustrated above are readily adaptable for use as dispersants in mineral lubricating oils. Such compositions provide a desirable alkaline reserve and are satisfactorily stable over long periods of time under the conditions of normal service. The lubricating oils containing these compositions as addition agents are useful, for example, as crankcase lubricants in automotive engines, as gear lubricants, as slushing oils, as metal-working oils, and the like.

As mentioned earlier a particularly useful application of the oil-soluble compositions of this invention is as addition agents in lubricating oils for use in automatic transmissions which employ frictional clutch surfaces. In such application, the oil-soluble compositions function not only to contribute detergency and to provide an alkaline reserve, but also to impart to the lubricating oil the desirable friction characteristics. Thus, while the improved lubricating oil compositions containing these oil-soluble compositions are useful in automatic transmissions of any type, they are especially valuable as lubricants for mechanical clutch type automatic transmissions wherein the clutch plates have a tendency to chatter during engagement. The use of the herein described improved lubricating oil compositions in such automatic transmissions significantly minimizes chattering and roughness in gear shifting. It is apparent that these lubricating compositions should be useful also wherever frictional clutch surfaces are employed and indeed they have been found to be quite useful in the operation of fluid-cooled disc brakes, power take-offs on tractors, etc.

The optimum amounts of the oil-soluble compositions to be employed in a lubricating oil have been found to be within the range of from about 0.25% to about 5% by weight (based on sulfate ash) of the total lubricant composition. In most cases, such amounts are in the neighborhood of from about 0.5% to about 1.0%. Except for considerations of economy, there is generally no disadvantage attending the use of amounts in excess of that normally required.

Although the additives of this invention have been shown to be useful by themselves for the purpose of providing the frictional properties described herein the ordinary requirements of a present-day lubricant generally include other properties as well. Thus in the lubrication of an automatic transmission unit having frictional clutch surfaces it is necessary that the lubricant provide not only these frictional lubricating properties, but it must also provide a certain minimum detergency, some rust and corrosion inhibition, a relatively high viscosity index, and it should have little or no foam tendencies. These properties may be provided by a wide variety of additives. Thus the required detergency usually is supplied by the presence of alkaline earth metal mahogany sulfonates, but may also be supplied by alkaline earth metal salts of synthetic alkaryl sulfonates, polybutylene-phosphorus pentasulfide reaction products, wax phenol sulfonates, and other acidic materials. Generally these alkaline earth metal salts are those which contain a stoichiometrically excessive amount of metal which has been neutralized by carbonation with carbon dioxide as set forth in U.S. 2,616,905. As regards the requirements for inhibition of corrosion this can be met by the incorporation into the lubricant of zinc dialkyl phosphorodithioates, terpene-phosphorus pentasulfide reaction products or other known inhibitors. Protection from extreme pressure may be afforded by oil-soluble sulfides and polysulfides, chlorinated paraffin hydrocarbons, etc. The stabilization of viscosity can be achieved by the inclusion in the lubricant of polyalkylmethacrylates or polybutenes. As for the suppression of foam this is best accomplished by the use of very small amounts of a dialkyl silicone polymer.

The anti-chattering characteristics of the oil-soluble compositions may be illustrated by the results, as summarized in the following table, of an accelerated chatter test in which the anti-chattering characteristics of a lubricant are measured in terms of the intensity of noise developed during the engagement of a rotating plastic friction plate with a stationary steel friction plate while the interface between the plates is being lubricated by the test lubricant. The test is conducted under conditions simulating that encountered in actual operation of many types of commercial frictional clutches. In brief, the apparatus employed in this test consists of: (1) a carbon steel cup (having an inner flat horizontal surface) equipped with a chatter-transmitter microphone wired to an electronic audio-amplifier which is in turn wired to an electric output recording meter for measuring the chatter-intensity, the base of the cup being used both as a reservoir for the test lubricant and as one of the test friction plates; (2) a hard phenolic plastic circular friction plate mounted horizontally on the lower end of the vertical shaft of an electric motor-driven drill press; and (3) means for holding the steel cup in stationary position throughout the operation of the apparatus.

In conducting the test, a 4-gram sample of the test lubricant is placed in the steel cup and heated to approximately 150° F.; the disc, while being rotated at a speed of about 80 r.p.m. on its vertical center axis as driven through the drill press shaft by a 0.75 horsepower electric motor, is lowered toward the steel cup containing the lubricant and eventually pressed under a load of about 175 pounds into close face contact with the base of the stationary steel cup; after about two minutes of rubbing of the friction plates to attain equilibrium conditions, a noise-intensity reading is taken on the recording meter. The noise-intensity is recorded on an arbitrary scale of from 0 to 500, 0 being indicative of the complete absence of noise and 500 being indicative of extreme noise development. On this scale, a typical lubricating oil without the oil-soluble composition of this invention gives a noise-intensity reading of about 400 under the test conditions. A reduction of the noise-intensity reading to about 200 is considered a substantial improvement, and a reduction to about 80 or less is considered an excellent improvement.

The base oil employed in these tests comprised a Mid-Continent, solvent-refined lubricating oil blend having a viscosity value of about 40 Saybolt Universal Seconds at 100° F. and viscosity index value of about 100 plus about 1.0% by weight of a polyalkylmethacrylate (viscosity index improving agent).

*Table of results of the accelerated chatter test*

| No. | Lubricant (% by weight) | Chatter-Intensity Reading |
|---|---|---|
| 1 | Base oil | 430 |
| 2 | Base oil+0.70% as sulfate ash of Product of Example 3. | 180 |
| 3 | Base oil+0.87% as sulfate ash of Product of Example 10. | 100 |
| 4 | Base oil+0.35% as sulfate ash of Product of Example 12. | 140 |
| 5 | Base oil+1.05% as sulfate ash of Product of Example 12. | 60 |
| 6 | Base oil+0.74% as sulfate ash of Product of Example 11. | 60 |
| 7 | Base oil+0.29% as sulfate ash of Product of Example 9. | 290 |
| 8 | Base oil+0.53% as sulfate ash of Product of Example 12+1.3% of Ba sulfonate+2% of zinc phosphorodithioate. | 38 |
| 9 | Base oil+0.53% as sulfate ash of Product of Example 12+4.3% of Ca-Ba alkyl phenate sulfide-sulfonate+2% of zinc phosphorodithioate. | 32 |
| 10 | Base oil+1.05% as sulfate ash of Product of Example 12+1.2% of Ba sulfonate, 0.8% of polybutylene-$P_2S_5$-S-$H_2O$-BaO+2% of zinc phosphorodithioate. | 26 |
| 11 | Base oil+1.05% as sulfate ash of Example 12+2% of polybutene-$PCl_3$-S-$H_2O$-BaO+2% of zinc phosphorodithioate. | 26 |
| 12 | Base oil+0.53% as sulfate ash of Product of Example 12+4.3% of Ca-Ba alkyl phenate sulfide-sulfonate. | 34 |
| 13 | Base oil+1.05% as sulfate ash of Product of Example 12+2% of zinc phosphorodithioate. | 24 |
| 14 | Base oil+0.89% as sulfate ash of Product of Example 13+4.3% of Ca-Ba alkyl phenate sulfide-sulfonate+2% of zinc phosphorodithioate. | 38 |
| 15 | The refined mineral oil of the base oil+1.05% as sulfate ash of Product of Example 12. | 76 |

(a) The "Ba sulfonate" is a basic barium mahogany sulfonate prepared by a process such as that illustrated by example 39 of U.S. 2,616,905.
(b) the "zinc phosphorodithioate" is the zinc salt of a phosphorodithioic acid in which the alkyl groups are lower alkyl groups.
(c) the "Ca-Ba alkyl phenate sulfide-sulfonate" is a mixture of calcium and barium salts of a mixture of an alkyl phenol sulfide and mahogany sulfonic acid (Paranox 64).
(d) the "polybutylene-$P_2S_5$-S-$H_2O$-BaO" is the barium salt of a steam-treated reaction product of polyisobutylene, phosphorus pentasulfide and sulfur.
(e) the "polybutylene-$PCl_3$-S-$H_2O$-BaO" is the barium salt of a steam-treated reaction product of polyisobutylene, phosphorus trichloride and sulfur.

The efficacy of the oil-soluble compositions of this invention as transmission lubricant addition agents may be further demonstrated by results obtained from the Cadillac Hydromatic Transmission Lubricant Test. In this test, the test lubricant is employed as the transmission lubricant in a 1956 Hydromatic transmission connected to a 1956 Cadillac engine operated for 300 hours under the following conditions:

Operation cycle: 15 seconds at idle—
  45 seconds at 2100 r.p.m. in fourth gear at a load of 59.5 brake horsepower (acceleration through first, second, and third gears)
Transmission oil sump temperature: 275° F.±2°
Engine water-outlet temperature: 160°–180° F.
Crankcase oil temperature: 250° F.

The lubricant is said to fail the test if a chatter-like noise is noted prior to the completion of the test during the shifting of gears. After completion of the test, the transmission is dismantled and the amount of sludge formed as insoluble aggregates and the amount of varnish formed as deposits on the various parts of the transmission are noted and rated on a numerical scale from 10 to 0, 10 being indicative of no sludge or varnish formation and 0 being indicative of heavy sludge or varnish formation. In this test, Lubricant No. 8 above containing 1.05% by weight as sulfate ash of the product of Example 12 (instead of half this amount) gave a sludge rating of 10 and a varnish rating of 9.6. No chatter-like noise was developed throughout the test whereas the lubricant without the oil-soluble composition of this invention failed the test because of development of the chatter-like noise prior to the completion of the test. The level of noise in this latter test was such that the test had to be halted after 45 hours.

The utility of the oil-soluble compositions of this invention as engine lubricant addition agents may be illustrated by the CRC-L-4-545 engine test. In this test, the lubricant tested in the Cadillac Transmission Lubricant Test was employed as the crankcase lubricant in a Chevrolet six-cylinder engine operated for 36 hours under standard test conditions. The test result showed an engine deposit rating of 90 (100 being perfectly clean), a corrosion of 96 milligrams per average whole bearing, and a piston varnish rating of 9.3 (10 being no varnish).

This application is a continuation-in-part of copending application Serial No. 539,670, filed October 10, 1955, now abandoned, and also of application Ser. No. 763,443, filed September 26, 1958.

Other modes of applying the principle of the invention may be employed, change being made as regards the details described, provided the features stated in any of the following claims or the equivalent of such be employed.

I, therefore, particularly point out and distinctly claim as my invention:

1. An improved lubricating composition comprising a major proportion of a mineral lubricating oil and in combination therewith from about 0.25 to about 5.0 percent by weight as sulfate ash of a product prepared by a process which comprises preparing a mixture of (a) an alkylated phenolic compound,
(b) an oil-soluble, metal-free, non-tautomeric polar compound having at least 12 aliphatic carbon atoms selected from the class consisting of esters, alcohols and amines, present in an amount greater than that of (a) and up to about fifteen times as much as (a), on a weight basis, and
(c) at least two equivalents of a basic barium compound per equivalent of (a), and heating said mixture to drive off substantially all free water which may be present and then treating said water-free mixture with carbon dioxide until the titratable basicity of the mixture has been reduced to a base number less than 10.

2. The lubricating composition of claim 1 characterized further in that the alkylated phenolic compound of (a) is a lower alkyl phenol in which the alkyl group contains at least about 3 carbon atoms.

3. The lubricating composition of claim 1 characterized further in that the oil-soluble, metal-free, non-tautomeric polar compound of (b) is a neutral compound.

4. The lubricating composition of claim 1 characterized further in that the oil-soluble, metal-free, non-tautomeric polar compound of (b) is an ester.

5. The lubricating composition of claim 1 characterized further in that the oil-soluble, metal-free, non-tautomeric polar compound of (b) is an alcohol.

6. The lubricating composition of claim 1 characterized further in that the oil-soluble, metal-free, non-tautomeric polar compound of (b) is sperm oil.

7. The lubricating composition of claim 1 characterized further in that the basic inorganic metal compound (c) is barium oxide and is present in an amount up to about 100 equivalents per equivalent of (a).

8. The lubricating composition of claim 1 characterized further in that the barium compound of (c) is present in the mixture in an amount at least 5 times that of (a).

9. An improved lubricating composition comprising a major proportion of a mineral lubricating oil and in combination therewith from about 0.25 to about 5.0% by weight as sulfate ash of a product prepared by a process which comprises preparing a mixture of (a) an alkylated phenolic compound,
(b) an ester having at least 12 aliphatic carbon atoms, present in an amount greater than that of (a) and up to about fifteen times as much as (a), on a weight basis, and
(c) at least two equivalents of a barium compound selected from the class consisting of barium oxide and barium hydroxide, per equivalent of (a) and heating said mixture to drive off substantially all free water which may be present and then treating said water-free mixture with carbon dioxide until the titratable basicity of the mixture has been reduced to a base number less than 10.

10. The lubricating composition of claim 9 characterized further in that the barium compound of (c) is present in an amount up to the limit of solubility of barium in the product of the process.

References Cited in the file of this patent

UNITED STATES PATENTS

| | | |
|---|---|---|
| 2,616,924 | Asseff et al. | Nov. 4, 1952 |
| 2,762,774 | Popkin | Sept. 11, 1956 |
| 2,781,403 | Kane et al. | Feb. 12, 1957 |